No. 765,690. PATENTED JULY 26, 1904.
R. TRÜB.
APPARATUS FOR PRODUCING GYRATORY MAGNETIC LINES OF FORCE
FOR THERAPEUTIC PURPOSES.
APPLICATION FILED SEPT. 12, 1902.
NO MODEL.
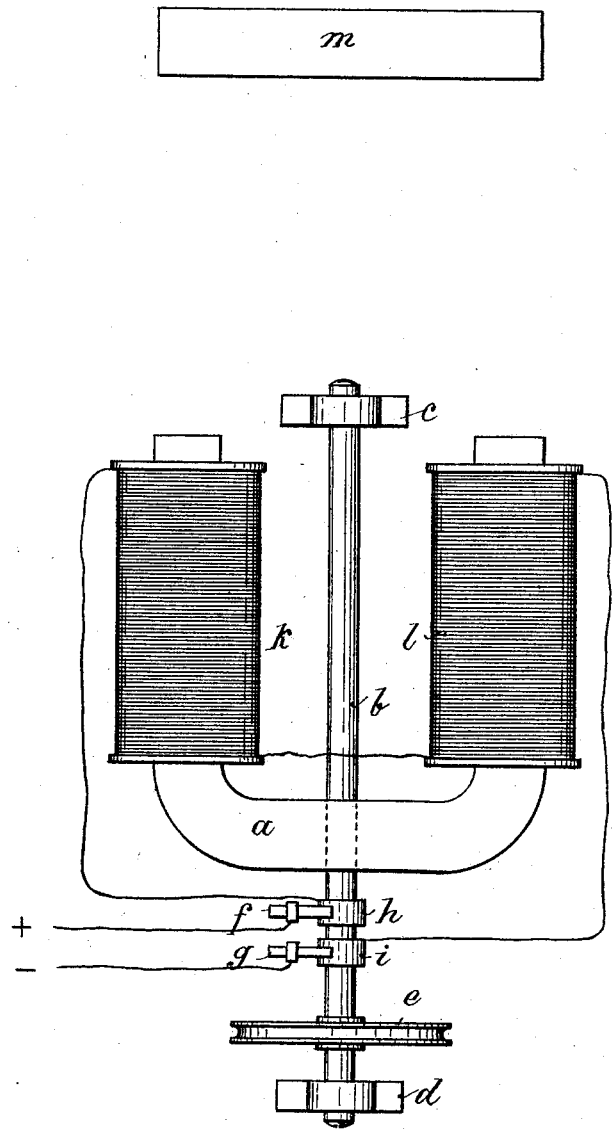
Witnesses.
Oswald Schmidt.
Paul F. //////
Inventor.
Reinhold Trüb
by
Enrique Witte
Attorney.

No. 765,690. Patented July 26, 1904.

UNITED STATES PATENT OFFICE.

REINHOLD TRÜB, OF HOMBRECHTIKON, NEAR ZURICH, SWITZERLAND.

APPARATUS FOR PRODUCING GYRATORY MAGNETIC LINES OF FORCE FOR THERAPEUTIC PURPOSES.

SPECIFICATION forming part of Letters Patent No. 765,690, dated July 26, 1904.

Application filed September 12, 1902. Serial No. 123,158. (No model.)

*To all whom it may concern:*

Be it known that I, REINHOLD TRÜB, a citizen of the Republic of Switzerland, residing at Hombrechtikon, near Zurich, in the Republic of Switzerland, have invented certain new and useful Improvements in Apparatus for Producing Gyratory Magnetic Lines of Force for Therapeutic Purposes, of which the following is a specification.

In recent years electric or magnetic lines of force have been employed for the purpose of curing diseases—in particular nervous complaints.

The apparatus employed for the object in view consists of an electromagnet which is excited either by a direct or alternating current. In the latter case sinuous lines of force are produced the curative action of which has been proved to be stronger than of the direct current.

The subject of my invention is the production of gyratory magnetic lines of force with the assistance of which the curative effect can be still further increased than is possible with sinuous lines of force, since, *e. g.*, the nerves or nervous systems which are exposed to their action are operated upon in most diverse directions, so that the stimulating effect exerted is greater.

The purpose which I have in view is most simply attained by means of one or more magnets, which may be permanent or electro magnets, rotating on a common shaft.

When electromagnets are used, they may be excited by either a direct or an alternating current. In the latter case the lines of force are both sinuous and gyratory.

The action of the gyratory lines of force can be strengthened by placing the apparatus opposite a block of soft iron of suitable form so arranged that the part of the body to be treated is located between apparatus and block. In this manner the lines of force will be better held together and prolonged in a well-known manner, a matter of special importance when internal organs are to be treated.

One form of my invention is illustrated in the annexed drawing.

$a$ is an electromagnet rigidly mounted on a shaft $b$, running in bearings $c\ d$.

$e$ is a grooved pulley keyed at one end of the shaft $b$, whereby the latter, with the electromagnet, can be rotated at any desired speed.

The current is conducted by the springs $f\ g$ contacting with the insulated collars $h\ i$ of the shaft $b$, said collars being electrically connected with the coils $k$ and $l$ of the electromagnet. Opposite the poles of the latter is located a block $m$, of soft iron, for the purpose above mentioned.

Having thus described my invention, what I claim as new, and desire to secure by Letters Patent, is—

1. An apparatus for producing gyratory magnetic lines of force for therapeutic purposes and the like, comprising a rotary shaft mounted in a bearing at each end, one or more electromagnets fixed to the shaft and rotating around its axis, a block of soft iron separated from and opposite the poles of the electromagnets, insulated electric conducting-collars fixed to the rotating shaft, electric connections with said collars and coils of the electromagnets, and means for rotating said shaft and electromagnets.

2. An apparatus for producing gyratory magnetic lines of force for therapeutic purposes, comprising a rotary shaft mounted in a bearing at each end, one or more electromagnets fixed to the shaft and rotating around its axis, a block of soft iron separated from and opposite the poles of the electromagnets, and means for passing an alternating current through the coils of the said electromagnets.

In testimony whereof I have hereunto signed my name in the presence of two subscribing witnesses.

REINHOLD TRÜB.

Witnesses:
 FRIEDRICH F. KREILING,
 PAUL F. ULLENDORFF.